US012676900B2

(12) United States Patent　　(10) Patent No.:　US 12,676,900 B2
Al-Mehdar et al.　　(45) Date of Patent:　Jul. 7, 2026

(54) IMS ROUTING BASED ON SUBSCRIBER TYPE

(71) Applicant: T-Mobile USA, Inc., Bellevue, WA (US)

(72) Inventors: Mohammed Al-Mehdar, Bellevue, WA (US); Shujaur Mufti, Snoqualmie, WA (US); Khurram Ahmad Mirza, Bellevue, WA (US); Saqib Badar, Bellevue, WA (US); Kalyan Kalepu, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 22 days.

(21) Appl. No.: 18/658,261

(22) Filed: May 8, 2024

(65) Prior Publication Data

US 2024/0291871 A1　　Aug. 29, 2024

Related U.S. Application Data

(63) Continuation of application No. 18/070,003, filed on Nov. 28, 2022, now Pat. No. 12,052,294, which is a
(Continued)

(51) Int. Cl.
　　H04L 65/1016　　　(2022.01)
　　H04L 61/503　　　(2022.01)
　　(Continued)

(52) U.S. Cl.
　　CPC ........ H04L 65/1069 (2013.01); H04L 61/503 (2022.05); H04L 65/00 (2013.01);
　　(Continued)

(58) Field of Classification Search
　　CPC ... H04L 65/1069; H04L 61/503; H04L 65/00; H04L 65/1016; H04L 65/1073; H04L 65/1104; H04M 15/66; H04W 8/04
　　See application file for complete search history.

(56) References Cited

U.S. PATENT DOCUMENTS 10,084,700 B1　9/2018　Malhotra et al.
2006/0056394 A1*　3/2006　Kuure ............... H04W 28/0268
　　　　　　　　　　　　　　　　370/352

(Continued)

FOREIGN PATENT DOCUMENTS

DE　　102011015727　　10/2011
WO　　WO2008083582　　7/2008

OTHER PUBLICATIONS

Office Action for U.S. Appl. No. 18/070,003, mailed on Dec. 21, 2023, Al-Meh.

(Continued)

*Primary Examiner* — Lesa M Kennedy

(74) *Attorney, Agent, or Firm* — Lee & Hayes, P.C.

(57) ABSTRACT

A network operator can partition network elements, including elements of an IP Multimedia Subsystem (IMS) or Policy and Charging Rules Functions (PCRFs) into groups reserved for specific types of subscribers. When a user equipment (UE) registers with an IMS, elements of the IMS can contact a Home Subscriber Server (HSS) to determine a subscriber type associated with the UE. Based on the UE's subscriber type, an IMS element can determine an application server or other IMS element to contact about the UE based on identifying application servers or IMS elements that are also associated with the same subscriber type as the UE. Similarly, an IMS element can determine a PCRF to contact about the UE based on identifying a PCRF that is associated with the same subscriber type as the UE.

18 Claims, 8 Drawing Sheets

Related U.S. Application Data continuation of application No. 16/442,343, filed on Jun. 14, 2019, now Pat. No. 11,516,261.

(51) Int. Cl.

| | |
|---|---|
| *H04L 65/00* | (2022.01) |
| *H04L 65/1069* | (2022.01) |
| *H04L 65/1073* | (2022.01) |
| *H04L 65/1104* | (2022.01) |
| *H04M 15/00* | (2024.01) |
| *H04W 8/04* | (2009.01) |

(52) U.S. Cl.
CPC ...... *H04L 65/1016* (2013.01); *H04L 65/1073* (2013.01); *H04L 65/1104* (2022.05); *H04M 15/66* (2013.01); *H04W 8/04* (2013.01)

(56) References Cited

U.S. PATENT DOCUMENTS

| | | | |
|---|---|---|---|
| 2008/0194255 | A1 | 8/2008 | Walker et al. |
| 2008/0195535 | A1 | 8/2008 | Liu |
| 2008/0205267 | A1 | 8/2008 | El Barachi et al. |
| 2008/0305794 | A1 | 12/2008 | Mukaiyama et al. |
| 2009/0023443 | A1 | 1/2009 | Kieselmann et al. |
| 2009/0129388 | A1 | 5/2009 | Akhtar |
| 2010/0154029 | A1 | 6/2010 | Alonso |
| 2010/0184403 | A1 | 7/2010 | Cai et al. |
| 2011/0149750 | A1 | 6/2011 | Sharma et al. |
| 2011/0302289 | A1 | 12/2011 | Shaikh et al. |
| 2012/0239771 | A1 | 9/2012 | Rasanen |
| 2016/0219428 | A1 | 7/2016 | Noldus |
| 2017/0126747 | A1 | 5/2017 | Merino Vazquez et al. |
| 2017/0134438 | A1 | 5/2017 | Lu et al. |
| 2017/0163432 | A1 | 6/2017 | Castro Castro et al. |
| 2018/0007612 | A1 | 1/2018 | Jahangir |
| 2018/0070262 | A1 | 3/2018 | Nakano et al. |
| 2018/0279214 | A1 | 9/2018 | Chandramouli et al. |
| 2020/0396262 | A1 | 12/2020 | Al-Mehdar et al. |
| 2023/0088323 | A1 | 3/2023 | Al-Mehdar |

OTHER PUBLICATIONS

Extended European Search Report mailed Sep. 10, 2020 for European Patent Application No. 20177266.2, 8 pages.

Office Action for U.S. Appl. No. 16/442,343, mailed on Feb. 24, 2021, Al-Mehdar, "IMS Routing Based on Subscriber Type", 19 Pages.

Office Action for U.S. Appl. No. 16/442,343, mailed on Feb. 28, 2022, Al-Mehdar, "IMS Routing Based on Subscriber Type", 25 pages.

Office Action for U.S. Appl. No. 16/442,343, mailed on Aug. 12, 2021, Al-Mehdar, "IMS Routing Based on Subscriber Type", 27 pages.

Office Action for U.S. Appl. No. 18/070,003, mailed on Aug. 18, 2023, Inventor #1 Mohammed Al-Mehdar, "IMS Routing Based on Subscriber Type," 29 pages.

* cited by examiner

122

| Subscriber Type 202 | Other Profile Data 204 |
|---|---|
| A | Name, IMPI, MSISDN, Assigned S-CSCF ID, ... |
| B | ... |
| A | ... |
| A | ... |
| C | ... |
| D | ... |
| B | ... |
| ... | ... |
| ... | ... |

User Profile 124(1)
User Profile 124(2)
User Profile 124(3)
User Profile 124(4)
User Profile 124(5)
User Profile 124(6)
User Profile 124(7)
User Profile 124(8)
User Profile 124(N)

Receive UE's SIP Register Message from P-CSCF
602

Send UAR to HSS
604

Receive UAA from HSS indicating subscriber type
associated with UE
606

Assign UE to S-CSCF that is associated with same
subscriber type
608

Forward UE's SIP Register Message to
assigned S-CSCF
610

Receive UE's SIP Register Message
802

Forward SIP Register Message towards S-CSCF
804

Receive SIP response message from S-CSCF
indicating subscriber type associated with UE
806

Send PCRF request message to PCRF associated
with same subscriber type as UE
808

IMS ROUTING BASED ON SUBSCRIBER TYPE

RELATED APPLICATIONS

This application is a continuation of and claims priority to U.S. patent application Ser. No. 18/070,003, filed Nov. 28, 2022, titled "IMS ROUTING BASED ON SUBSCRIBER TYPE," which is a continuation of and claims priority to U.S. patent application Ser. No. 16/442,343, filed Jun. 14, 2019, now U.S. Pat. No. 11,516,261, titled "IMS ROUTING BASED ON SUBSCRIBER TYPE," the entirety of both which are incorporated herein by reference.

BACKGROUND

A telecommunication network can include an IP Multimedia Subsystem (IMS) that can manage communication sessions for mobile phones and other user equipment (UE). For example, an IMS can include elements that set up communication sessions for a UE and that provide services during such communication sessions, such as services for voice calls, video calls, or messaging.

An IMS registration process can occur when a UE attaches to the telecommunication network. During IMS registration, the UE can attach to, and/or be assigned to, various IMS elements. The IMS elements can handle message routing, provide services, or otherwise assist with communication sessions for the UE.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
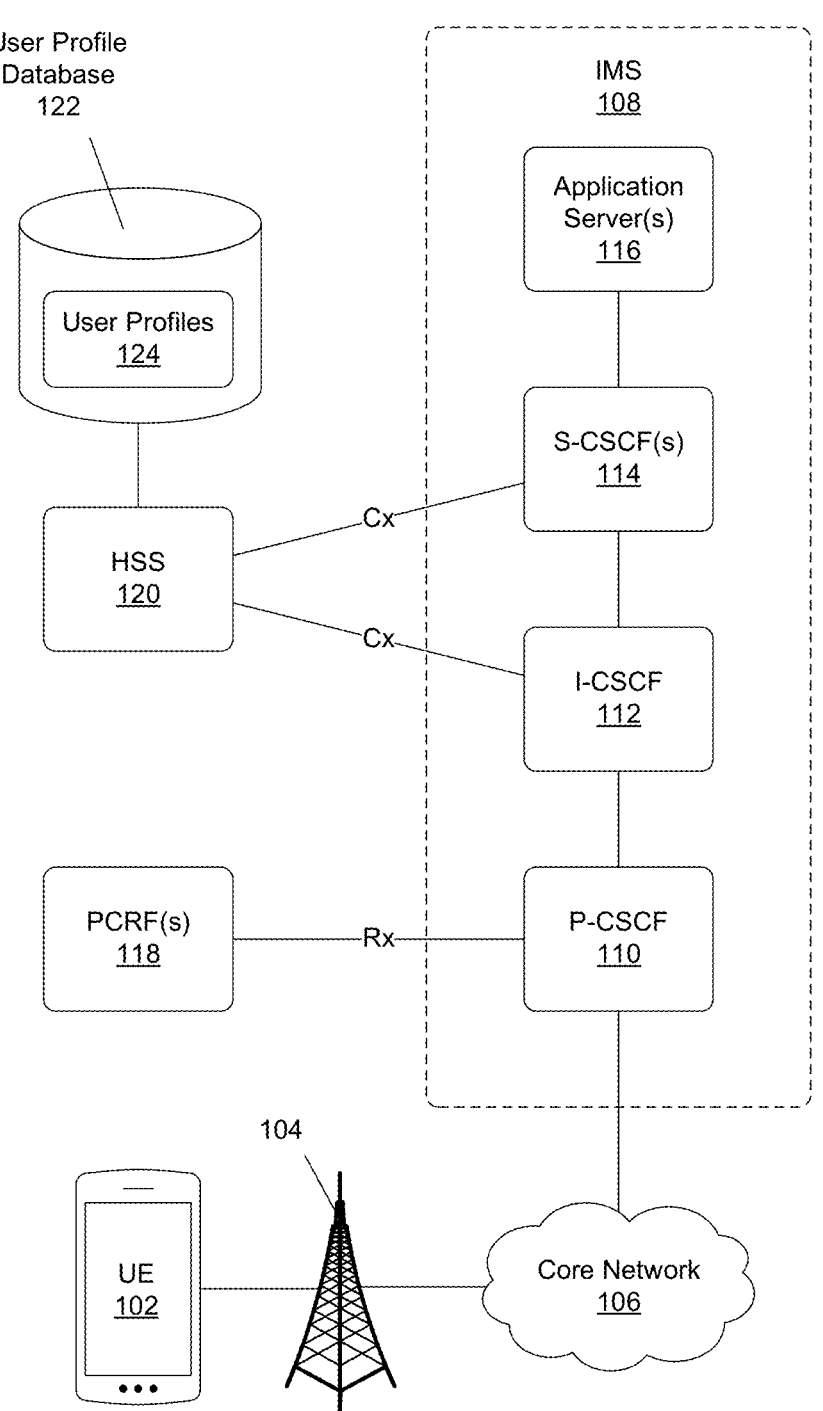
FIG. 1 depicts an example network environment in which user equipment (UE) can connect to a telecommunication network.

A telecommunication network can include an IP Multimedia Subsystem (IMS). An IMS can set up and manage communication sessions for user equipment (UE), such as sessions for voice calls, video calls, or other types of communications. An IMS can have Call Session Control Functions (CSCFs) that can register UEs with the IMS and manage communication sessions. The IMS can also have application servers that provide services for the communication sessions, such as services for voice calls, video calls, or other types of communications. For example, the IMS can have a telephony application server (TAS) that provides telephony services, such as services for voice and/or video calls.

When a UE attaches to the telecommunication network, an IMS registration process can occur. During IMS registration, the UE can send a registration message to a Proxy CSCF (P-CSCF) in the IMS. The P-CSCF can forward the registration message to an Interrogating CSCF (I-CSCF), which can assign the UE to a particular Serving CSCF (S-CSCF). The S-CSCF can authenticate the UE to complete the UE's registration with the IMS. The S-CSCF can also send third party registration messages about the UE to one or more application servers, and the application servers can, in response, provide services for the UE's communication sessions. The P-CSCF can also request that a Policy and Charging Rules Function (PCRF) provide a core network with provide Policy and Charging Control (PCC) rules associated with the communication sessions for the UE. For example, PCC rules can define how data packets associated with the communication sessions for the UE should be handled, or how a subscriber account associated with the UE should be charged.

Conventionally, network elements such as S-CSCFs, application servers, or PCRFs are configured to help set up and/or manage communication sessions for any UE. However, in some cases an operator of a telecommunication network may want to carve out or reserve certain network elements specifically for UEs associated with particular types of subscribers. For example, the network operator may want to group or partition network elements into different realms or domains that are specific to particular subscriber types.

In some examples, a mobile network operator (MNO) that owns and operates a telecommunication network and provides services to its own subscribers may also grant a mobile virtual network operator (MVNO) access to the MNO's telecommunication network. This arrangement can allow the MVNO's subscribers to also receive services through the MNO's telecommunication network. In conventional MNO-MVNO relationships, the same network elements often handle communication sessions for both MNO subscribers and MVNO subscribers. However, the MNO may want to carve out a subset of the telecommunication network's elements into a designated realm to handle communication sessions just for MNO subscribers. Accordingly, if network elements that handle MVNO subscribers go offline, become overloaded, or experience other problems, a subset of network elements that have been carved out just for MNO subscribers may remain unaffected. As such, communication sessions for MNO subscribers could continue normally using network elements reserved for MNO subscribers even if elements of the same telecommunication network available for MVNO subscribers are experiencing problems.

In other examples, an MNO may want to carve out network elements for other types of subscribers. For instance, an MNO may want to carve out one set of network elements for subscribers that have access to Long-Term Evolution (LTE) services and another set of network elements for subscribers that have access to 5G services, or carve out different sets of network elements for MNO subscribers that are on different MNO service plan types or tiers.

Although it may be beneficial for an MNO to carve out or reserve network elements for particular types of subscribers, in conventional systems CSCFs may be unable to determine a subscriber type associated with a UE during IMS registration. Accordingly, in such conventional systems CSCFs may not be able to identify subsets of network elements that are associated with a particular UE's subscriber type during IMS registration, and thus not be able to select or route messages to network elements that correspond to the UE's subscriber type.

Described herein are systems and processes that allow IMS elements to determine a subscriber type associated with a UE during IMS registration. The IMS elements can then use that subscriber type to identify and select other network elements that are specifically associated with that subscriber type, and to route messages associated with the UE to network elements that are specifically associated with the UE's subscriber type.

Example Environment

FIG. 1 depicts an example network environment in which user equipment (UE) 102 can connect to a telecommunication network to engage in communication sessions for voice calls, video calls, messaging, data transfers, or any other type of communication. A UE 102 can be any device that can wirelessly connect to the telecommunication network. For example, a UE 102 can be a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device.

A UE 102 can connect to an access point 104, such as a base station, through which the UE 102 can access a core network 106 of the telecommunication network. The access point 104 and/or core network 106 can be compatible with one or more wireless access technologies, protocols, or standards. For example, wireless access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of wireless access technology.

In some examples, access points 104 can be part of a radio access network linked to the core network 106. For example, an access point 104 can be a base station, such as an evolved Node B (eNB) in an LTE network or a gNB in a 5G network. In other examples, an access point 104 can be a Wi-Fi access point or other type of access point that can be connected to the core network 106 through the Internet or another type of connection.

Gateways or other elements of the core network 106 can link the core network 106 to other networks, such as the Internet or an IP Multimedia Subsystem (IMS) 108. An IMS 108 can set up and/or manage communication sessions for UEs 102 that are connected to the core network 106, such as sessions for voice calls, video calls, messaging, or other types of communications.

An IMS 108 can include Call Session Control Functions (CSCFs) that can perform various operations including registering and authenticating UEs 102 with the IMS 108, routing messages, and managing communication sessions for UEs 102. As described in more detail below, CSCFs can include Proxy CSCFs (P-CSCFs) 110, Interrogating CSCFs (I-CSCFs) 112, and Serving CSCFs (S-CSCFs) 114. In some examples, the terms "CSCF," "P-CSCF," "I-CSCF," and/or "S-CSCF" can refer to other types of IMS nodes, such as nodes of a 5G-specific IMS 108 that may or may not have different names but that are configured to perform the same or similar functions as described herein. Example architecture for a CSCF is illustrated in greater detail in FIG. 5, and is described in detail below with reference to that figure.

The IMS 108 can also include application servers 116. While CSCFs can set up and manage communication sessions, application servers 116 can provide services for those communication sessions. For example, an application server 116 can be a telephony application server (TAS) that provides telephony services during a communication session, such as services for voice over LTE (VOLTE) calls or other voice calls, and/or video over LTE (VILTE) calls or other video calls. In other examples, application servers 116 can include a multimedia telephony application server (M-TAS), a rich messaging server (RMS), rich communication services (RCS) server, or other messaging server, a presence server, a notification server, or any other type of application server 116.

CSCFs in the IMS 108 can exchange data with each other, and/or with UEs 102 or application servers 116, using Session Initiation Protocol (SIP) messages. CSCFs in the IMS 108 can also communicate with other types of network elements through Diameter protocol interfaces and/or Representational State Transfer (REST) Hypertext Transfer Protocol (HTTP) requests instead of SIP messages.

For example, P-CSCFs 110 can be connected to Policy and Charging Rules Functions (PCRFs) 118 via Diameter protocol Rx interfaces and/or HTTP requests. A PCRF 118 can store and distribute Policy and Charging Control (PCC) rules that define how the core network 106 should treat data associated with communication session or how subscriber accounts should be charged. For example, a PCRF 118 can provide PCC rules to a gateway of the core network 106 via a Diameter protocol Gx interface. In some situations, a Policy Control Function (PCF) can be used in place of a PCRF 118, and a P-CSCF 110 can similarly reach a PCF via a Diameter protocol Rx interface or an HTTP request. For example, PCRFs 118 can be used to provide PCC rules in LTE and other 4G networks, while PCFs can provide PCC rules in 5G networks. As used herein, the term PCRF 118 can refer to a PCRF, a PCF, or any other similar element that can provide PCC rules.

As another example, I-CSCFs 112 and S-CSCFs 114 can communicate with a Home Subscriber Server (HSS) 120 via Diameter protocol Cx interfaces or HTTP requests. The HSS 120 can have, or be linked to, a user profile database 122 that stores user profiles 124. The user profiles 124 can contain information about users who may be associated with UEs 102, as discussed further below with respect to FIG. 2. In some examples, a Home Location Register (HLR) can take the place of the HSS 120 described herein, or be linked to an HSS 120, such that the HLR can also access the user profile database 122. As used herein, the term HSS 120 can refer to an HSS, an HLR, a combined HSS/HLR, a 5G Unified Data Management (UDM) element and/or other 5G elements that can manage or access user profiles 124, or any other similar element that can access a user profile database 122 and communicate with I-CSCFs 112 and S-CSCFs 114.

In some examples, PCRFs 118 and/or the HSS 120 can be considered part of the core network 106. In other examples, PCRFs 118 and/or the HSS 120 can be considered part of the IMS 108 or be considered to be outside the core network 106 and the IMS 108.

A P-CSCF 110 can be an entry point into the IMS 108 that routes SIP messages to and/or from UEs 102. For example, when a UE 102 is attached to the telecommunication networks, an IMS registration process can occur during which the UE 102 sends a SIP Register message to the P-CSCF 110. The P-CSCF 110 can then route the SIP Register message to an I-CSCF 112. A P-CSCF 110 can also use a Diameter protocol Rx interface or an HTTP request to communicate with a PCRF 118 about a communication session for a UE 102, such that the PCRF 118 can provide PCC rules for the communication session to a gateway of the core network 106 that is processing traffic for the UE 102. The PCC rules can define how the gateway should treat data associated with the communication session for the UE 102, for instance by identifying a Quality of Service (QoS) or a priority level associated with the communication session, or define how a subscriber account associated with the UE 102 should be charged.

An I-CSCF 112 can assign a UE 102 to a particular S-CSCF 114 during IMS registration, and/or route messages to or from an S-CSCF 114 when an S-CSCF 114 has already been assigned to the UE 102. For example, during IMS registration, an I-CSCF 112 can receive a SIP Register message associated with a UE 102 from a P-CSCF 110. The I-CSCF 112 can exchange messages with the HSS 120 over a Diameter protocol Cx interface or use HTTP requests to obtain data from a user profile 124 in the user profile database 122 that corresponds to the UE 102. The I-CSCF 112 can use the data from the user profile 124 to determine if an S-CSCF 114 has already been assigned to the UE 102, and if not can assign a new S-CSCF 114 to the UE 102. In some examples, the I-CSCF 112 can use the data from the user profile 124 when deciding which S-CSCF 114 to assign to the UE 102. The I-CSCF 112 can then forward the UE's SIP Register message to the assigned S-CSCF 114.

An S-CSCF 114 can be a registrar for the IMS 108 that receives SIP Register messages that originated from UEs 102, and authenticates the UEs 102 to complete the UEs' IMS registrations. For example, during IMS registration for a UE 102, the S-CSCF 114 can exchange messages with the HSS 120 over a Diameter protocol Cx interface or use HTTP requests to obtain data from a user profile 124 in the user profile database 122 that corresponds to the UE 102. The S-CSCF 114 can then use that data from the user profile 124 to authenticate the UE 102.

The S-CSCF 114 can also manage communication sessions for UEs 102, such as by sending or routing other types of SIP messages within the IMS 108. For example, during IMS registration for a UE 102, the S-CSCF 114 can send a third-party registration (TPR) message about the UE 102 to one or more application servers 116. In some examples, a TPR message can be a separate SIP Register message. A TPR message can inform an application server 116 that a UE 102 has registered with the IMS 108 and is ready to receive services from the application server 116 during a communication session.

Figure 2:
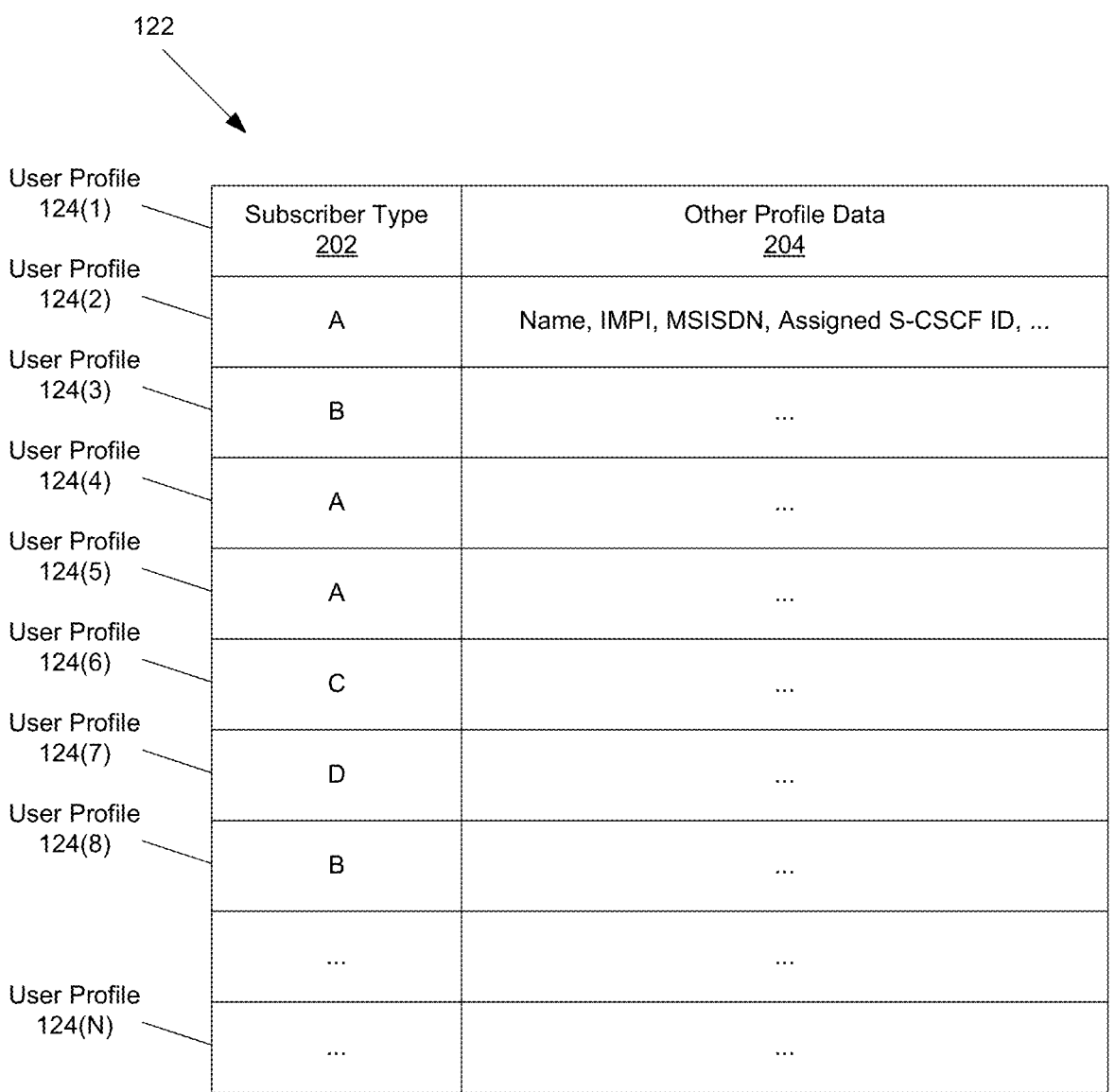
FIG. 2 depicts an example of user profiles stored in a user profile database.

FIG. 2 depicts an example of user profiles 124 stored in the user profile database 122. Each user profile 124 in the user profile database 122 can include information about users associated with UEs 102, such as subscribers to services that can be accessed via the IMS 108.

A user profile 124 can indicate a particular subscriber type 202 associated with a user. Multiple predefined subscriber types 202 can be known to the telecommunication network. For example, different values for the subscriber type 202 attribute in user profiles 124 can identify different types or classes of subscribers that may be associated with different classes of service, service levels, service plans, network operators, network generations, or other characteristics. Accordingly, the value of the subscriber type 202 in a user profile 124 for a particular user can indicate that the user has been categorized as a particular type of subscriber or is in a particular class of subscribers, distinct from other known types or classes of subscribers.

In some examples, a user profile's subscriber type 202 can identify a network operator associated with a user. For example, a mobile network operator (MNO) may own and/or operate the telecommunication network, including some or all parts of the IMS 108, and provide services to subscribers of the MNO via the telecommunication network. However, the MNO may also grant a mobile virtual network operator (MVNO) bulk access to the MNO's telecommunication network, such that the MVNO can provide services to the MVNO's own subscribers through the telecommunication network despite not owning or directly operating the telecommunication network. Accordingly, in this example, one value for the subscriber type 202 may indicate that a user is a subscriber of the MNO, while another value for the subscriber type 202 may indicate that a user is a subscriber of a particular MVNO.

In some examples, a user profile's subscriber type 202 can identify a network generation associated with a user, such as a network generation associated with certain services available to the user or a network generation associated with certain subscription plans or tiers. For example, an MNO or MVNO may offer some services to subscribers on an LTE plan and offer other services to subscribers on a 5G plan. Accordingly, in this example one value for the subscriber type 202 may indicate that a user is an LTE subscriber or has access to LTE services, while another value for the subscriber type 202 may indicate that a user is a 5G subscriber or has access to 5G services.

In some examples, a user profile's subscriber type 202 can identify a subscription plan type or tier associated with a user. For example, an MNO may offer a priority level subscription plan as well as standard subscription plans. Accordingly, in this example one value for the subscriber type 202 may indicate that a user is a subscriber to a priority level subscription plan, while another value for the subscriber type 202 may indicate that a user is a subscriber to a standard subscription plan.

In some examples, a user's particular subscriber type 202 can be indicated in a user profile 124 with a single value that maps to a particular subscriber type. For example, a subscriber type 202 can be expressed as an alphanumeric character, an integer, a binary value, text string, or any other value. In these examples, network elements such as the CSCFs, the application servers 116, and/or the PCRFs 118 can have predefined mappings of such values to corresponding subscriber types 202, such that the network elements can determine users' subscriber types 202 from such values. In other examples, the subscriber type 202 can expressed as a text string that explains a type or class of subscriber to which a user belongs, or otherwise be expressed as a value that can be interpreted by network elements without predefined mappings.

In some examples, a single value for the subscriber type 202 attribute of a user profile 124 can correspond to a single subscriber type 202. For example, in FIG. 2, subscriber type "A" may identify users who are subscribers to an MNO's services, while subscriber type "B" may identify users who are subscribers to services of a first MVNO that has access to the MNO's telecommunication network and subscriber type "C" may identify users who are subscribers to services of a second MVNO that has access to the MNO's telecommunication network. As another example, in FIG. 2, subscriber type "A" may identify users who are LTE subscribers, while subscriber type "B" may identify users who are 5G subscribers.

However, in other examples, a single value for the subscriber type 202 attribute of a user profile 124 can correspond to a specific combination of different subscriber types 202. For example, subscriber type "A" may identify users who are subscribers to an MNO's services and have a 5G plan, subscriber type "B" may identify users who are subscribers to an MNO's services and have an LTE plan, subscriber type "C" may identify users who are subscribers to an MVNO's services and have a 5G plan, and subscriber type "D" may identify users who are subscribers to an MVNO's services and have an LTE plan.

In still other examples, the subscriber type 202 attribute of a user profile 124 can be expressed as a combination of multiple individual values that may each indicate a different characteristic of a user's overall subscriber type 202. For example, a subscriber type 202 can be expressed as a three-byte value, with the first byte corresponding to a particular network operator, the second byte corresponding to a network generation, and the third byte corresponding to a service tier.

In addition to a subscriber type 202, a user profile 124 may also indicate other profile data 204 associated with a user. For example, the other profile data 204 can include one or more identifiers of the user, such as an international mobile subscriber identity (IMSI), IP Multimedia Private Identity (IMPI), IP multimedia public identity (IMPU), the user's name, an email address for the user, and/or other unique identifiers for the user. The other profile data 204 can also include other types of information, such as a Mobile Station International Subscriber Directory Number (MSISDN) associated with the user, an identifier of an S-CSCF 114 that has been assigned to a UE 102 associated with the user, if any, and/or any other information about the user.

The telecommunication network can carve out or reserve network elements for specific subscriber types 202, including S-CSCFs 114, application servers 116, and/or PCRFs 118. For example, an MNO can carve out one or more PCRFs 118 from a larger pool of PCRFs 118 exclusively for MNO subscribers, while leaving other PCRFs 118 in the larger pool available for use with MVNO subscribers. Accordingly, even if the PCRFs 118 available to MVNO subscribers become overloaded or experience other issues, the PCRFs 118 carved out exclusively for MNO subscribers may remain available. Additionally, in some examples, PCRFs 118 carved out for MNO subscribers may store PCC rules that are specifically applicable to MNO subscribers, while other PCRFs 118 available to MVNO subscribers may store other PCC rules that may apply to MVNO subscribers. As another example, an MNO may partition a pool of PCRFs 118 into a first realm that has PCC rules for LTE subscribers, and a second realm that has PCC rules for 5G subscribers.

As discussed above, a CSCF, such as an I-CSCF 112 or an S-CSCF 114, can retrieve data associated with user profiles 124 from the HSS 120 over Diameter profile Cx interfaces or via HTTP requests. According, during IMS registration for a UE 102, the HSS 120 can provide a CSCF with a subscriber type 202 from a user profile 124 associated with a user of the UE 102. The CSCF can then use policies to determine subsequent actions to take based on the subscriber type 202 associated with a UE 102. For example, an I-CSCF 112 that obtains a subscriber type 202 associated with a UE 102 can select and assign the UE 102 to an S-CSCF 114 that has been carved out or reserved for that particular subscriber type 202. As another example, an S-CSCF 114 that obtains a subscriber type 202 associated with a UE 102 can send a SIP message to a P-CSCF 110 that informs the P-CSCF 110 about the UE's subscriber type 202, such that the P-CSCF 110 can in turn contact a PCRF 118 that has been carved out or reserved for that particular subscriber type 202. An S-CSCF 114 that obtains a subscriber type 202 associated with a UE 102 can also send third-party registration (TPR) messages about the UE 102 to one or more application servers 116 that have been carved out or reserved for that particular subscriber type 202.

Figure 3:
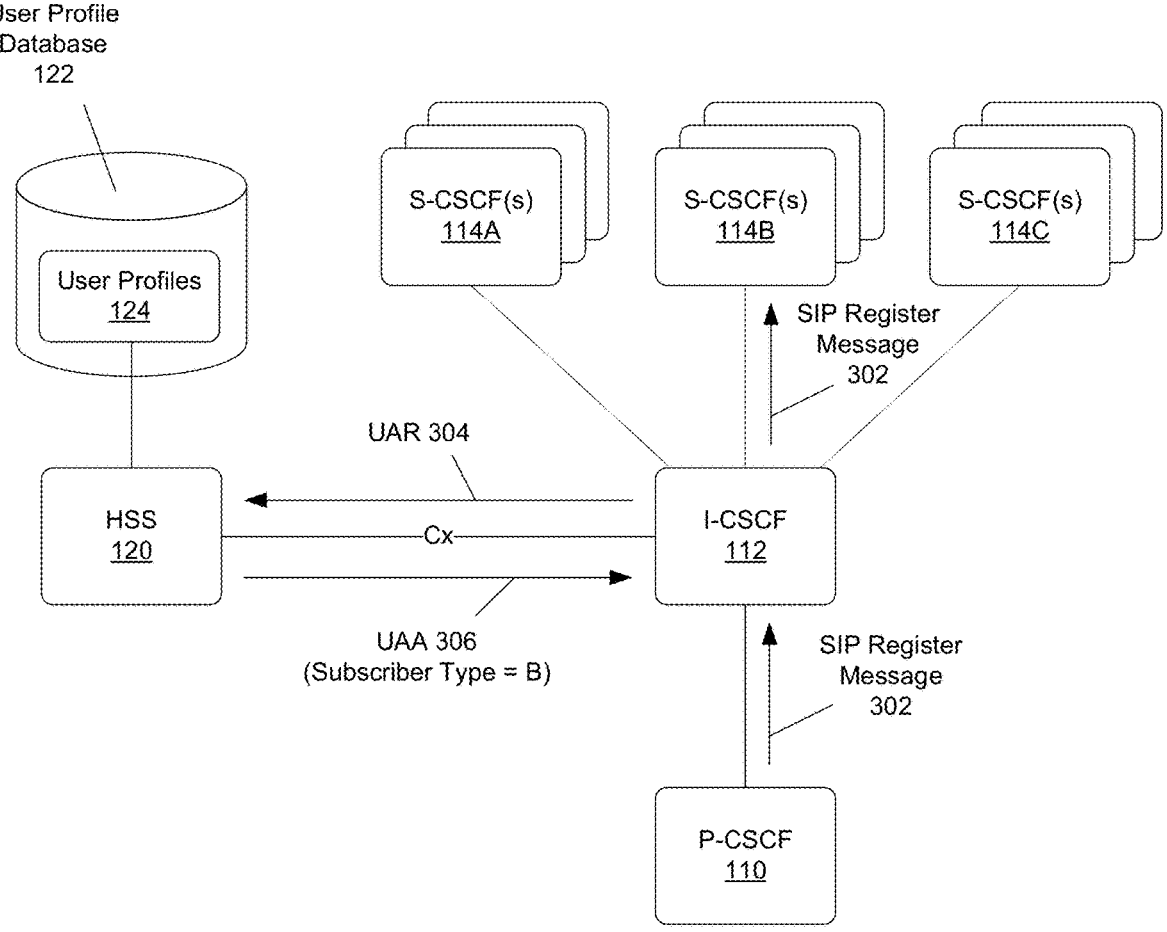
FIG. 3 depicts a first example of messages that can be sent between network elements during IP Multimedia Subsystem (IMS) registration for a UE based in part on a subscriber type associated with the UE.

FIG. 3 depicts a first example of messages that can be sent between network elements during IMS registration for a UE 102 based in part on a subscriber type 202 associated with the UE 102. In the example of FIG. 3, a network operator can have grouped a set of S-CSCFs 114 into subsets that each contain one or more S-CSCFs 114. In some example, a subset can include multiple S-CSCFs 114 for load balancing purposes. Each subset of S-CSCFs 114 can be associated with a particular subscriber type 202. For example, an MNO can carve out a first subset containing S-CSCFs 114A for subscribers of the MNO, a second subset containing S-CSCFs 114B for subscribers of a first MVNO, and a third subset containing S-CSCFs 114C for subscribers of a second MVNO.

A P-CSCF 110 can forward a SIP Register message 302 that it received from a UE 102 on to an I-CSCF 112. The SIP Register message 302 can include information about the UE 102 and/or a user of the UE 102, such as an IMPI, IMPU, and/or an IP address. In some examples, when the I-CSCF 112 receives a SIP Register message 302, the I-CSCF 112 can send a User Authorization Request (UAR) 304 to the HSS 120 via a Diameter protocol Cx interface. The UAR 304 can similarly include information about the UE 102 and/or a user of the UE 102, such that the HSS 120 can look up a user profile 124 associated with a user of the UE 102 in the user profile database 122. For example, the UAR 304 can include an IMPI included in the SIP Register message 302 from the UE 102, and the HSS 120 can identify a user profile 124 with that IMPI in other profile data 204. In other examples, the I-CSCF 112 can request data from a user profile 124 in an HTTP request.

In some examples, the HSS 120 can return some or all data from the user profile 124 to the I-CSCF 112 in a User Authorization Answer (UAA) 306 via the Diameter protocol Cx interface. The UAA 306 can include the value of the subscriber type 202 from the user profile 124. In some examples, the UAA 306 can include one or more attribute-value pairs (AVPs) for different types of information from the user profile 124, and one of the AVPs can contain the value of the subscriber type 202 from the user profile 124. For example, if the subscriber type 202 in the user profile 124 corresponding to the UE 102 was "B," the UAA 306 sent from the HSS 120 to the I-CSCF 112 can include an AVP indicating that the subscriber type 202 for the UE 102 is type "B." In other examples, the HSS 120 can return some or all data from the user profile 124 in a reply to an HTTP request from the I-CSCF 112, for instance by returning the value of the subscriber type 202 in an HTTP header. The I-CSCF 112 can have policies or mapping data in memory that allow the I-CSCF 112 to interpret subscriber type 202 values returned by the HSS 120.

In this example, data returned by the HSS 120 in an UAA 306 or other message may also indicate that no S-CSCF 114 has been assigned to the UE 102 yet. Accordingly, the I-CSCF 112 can use the subscriber type 202 associated with the UE 102 that was returned by the HSS 120 to identify a subset of S-CSCFs 114 that has been carved out for that subscriber type 202. For example, when an MNO has carved out a subset of S-CSCFs 114 containing S-CSCFs 114B for subscribers of a first MVNO, a UAA 306 indicates that the UE's subscriber type 202 is type "B," and subscriber type "B" is used to indicate that a user is a subscriber to the first MVNO's services, the I-CSCF 112 can determine that an S-CSCF 114B in the subset carved out for the first MVNO should be assigned to the UE 102.

After identifying and assigning an S-CSCF 114 in a subset corresponding to the same subscriber type 202 as the UE 102, the I-CSCF 112 can forward the UE's SIP Register message 302 to the selected S-CSCF 114. The selected S-CSCF 114 can then authenticate the UE 102 and complete the IMS registration for the UE 102.

In the example of FIG. 3, because the S-CSCF 114 that is selected by the I-CSCF 112 to receive the SIP Register message 302 corresponds to the same subscriber type 202 as the UE 102, the selected S-CSCF 114 may be better positioned to handle the UE 102 than S-CSCFs 114 associated with other subscriber types 202. For instance, the selected S-CSCF 114 may have policies, rules, or other configurations that are specific to the subscriber type 202 associated with the UE 102. Similarly, if S-CSCFs 114 associated with different subscriber types 202 go offline, become overloaded, or experience other issues, the selected S-CSCF 114 may remain available such that UEs 102 associated with the same subscriber type 202 can continue IMS registrations despite the problems with the other S-CSCFs 114.

Figure 4:
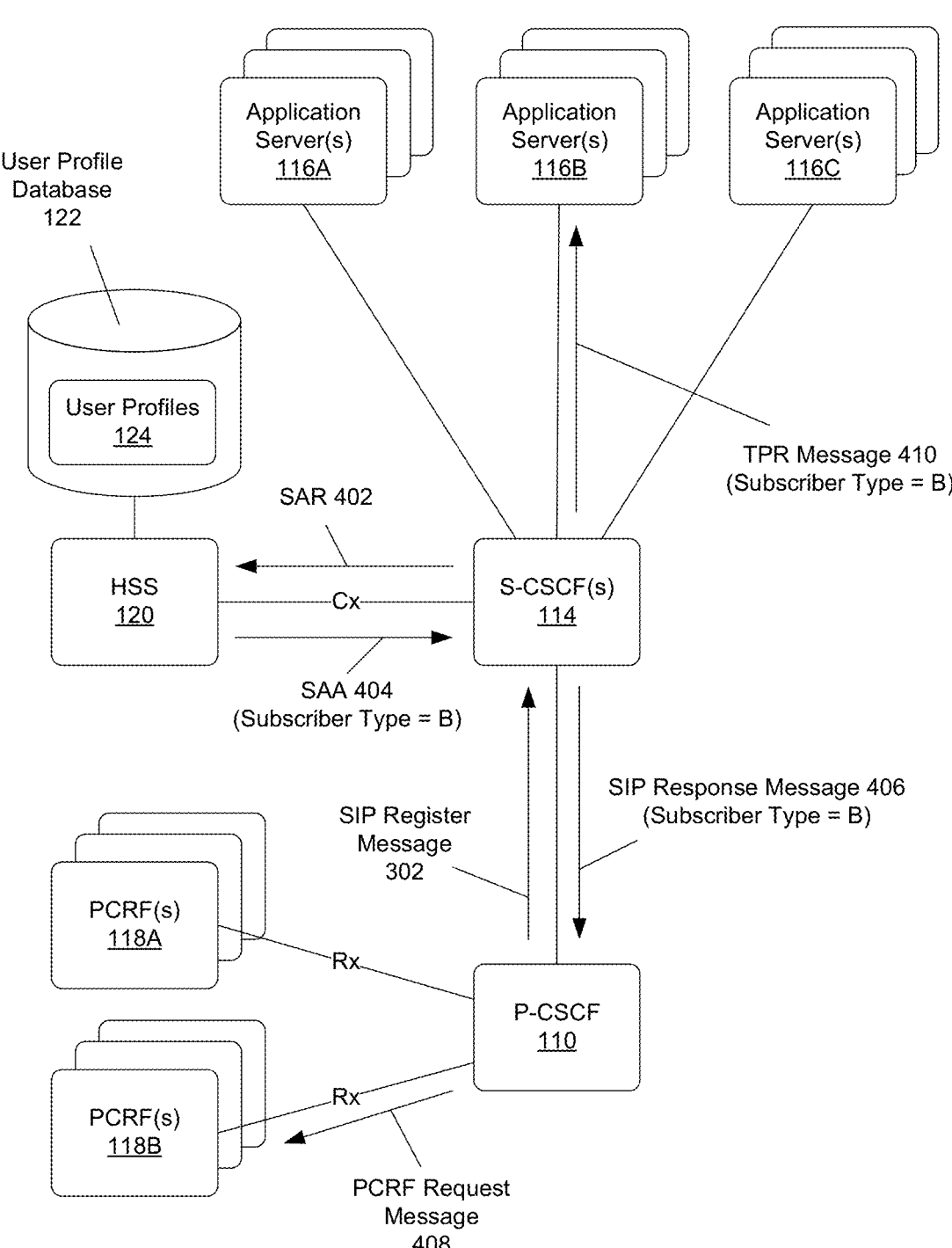
FIG. 4 depicts a second example of messages that can be sent between network elements during IMS registration for a UE based in part on a subscriber type associated with the UE.

FIG. 4 depicts a second example of messages that can be sent between network elements during IMS registration for a UE 102 based in part on a subscriber type 202 associated with the UE 102. In the example of FIG. 4, network operator can have grouped a set of application servers 116 into subsets that each contain one or more application servers 116. Each subset of application servers 116 can be associated with a particular subscriber type 202. For example, an MNO can carve out a first subset containing application servers 116A for subscribers of the MNO, a second subset containing application servers 116B for subscribers of a first MVNO, and a third subset containing S-CSCFs 114C for subscribers of a second MVNO. In some examples, each subset of application servers 116 for a particular subscriber types 202 can include duplicates of the same type of application server 116 for load balancing purposes, or different types of application servers 116. For example, a subset carved out for MNO subscribers can contain at least one TAS reserved for MNO subscribers and at least one RCS server reserved for MNO subscribers, while a different subset can include a TAS and an RCS reserved for MVNO subscribers.

In the example of FIG. 4, a network operator can also have grouped a set of PCRFs 118 into subsets that each contain one or more PCRFs 118. In some example, a subset can include multiple PCRFs 118 for load balancing purposes. Each subset of PCRFs 118 can be associated with a particular subscriber type 202. For example, an MNO can carve out a first subset containing PCRFs 118A for subscribers of the MNO and a second subset containing PCRFs 118B for subscribers of an MVNO.

In FIG. 4, a SIP Register message 302 received by a P-CSCF 110 from a UE 102 can be routed through the IMS 108 to an S-CSCF 114. For example, the SIP Register message 302 can be routed from a P-CSCF 110 to an S-CSCF 114 through an I-CSCF 112, as discussed above with respect to FIG. 3. The SIP Register message 302 can include information about the UE 102 and/or a user of the UE 102, such as an IMPI, IMPU, and/or an IP address. In some cases, the S-CSCF 114 can then authenticate the UE 102 in part based on information retrieved from the HSS 120 over a Diameter protocol Cx interface using a Multimedia Authorization Request (MAR) and a Multimedia Authorization Answer (MAA). For example, based on information returned to the S-CSCF 114 in a MAA, the S-CSCF 114 can exchange additional SIP messages with the UE 102, including a second SIP Register message 302 that contains authentication credentials.

The S-CSCF 114 can also send a Server Assignment Request (SAR) 402 to the HSS 120 via a Diameter protocol Cx interface. The SAR 402 can include information about the UE 102 and/or a user of the UE 102, such that the HSS 120 can look up a user profile 124 associated with a user of the UE 102 in the user profile database 122. For example, the SAR 402 can include an IMPI included in the SIP Register message 302 from the UE 102, and the HSS 120 can identify a user profile 124 with that IMPI in other profile data 204. In other examples, the S-CSCF 114 can request data from a user profile 124 in an HTTP request.

The HSS 120 can return some or all data from the user profile 124 to the S-CSCF 114 in a Server Assignment Answer (SAA) 404 via the Diameter protocol Cx interface. The SAA 404 can include the value of the subscriber type 202 from the user profile 124. In some examples, the SAA 404 can include one or more AVPs for different types of information from the user profile 124, and one of the AVPs can contain the value of the subscriber type 202 from the user profile 124. For example, if the subscriber type 202 in the user profile 124 corresponding to the UE 102 was "B," the SAA 404 sent from the HSS 120 to the S-CSCF 114 can include an AVP indicating that the subscriber type 202 for the UE 102 is type "B." In other examples, the HSS 120 can return some or all data from the user profile 124 in a reply to an HTTP request from the S-CSCF 114, for instance by returning the value of the subscriber type 202 in an HTTP header. The S-CSCF 114 can have policies or mapping data in memory that allow the S-CSCF 114 to interpret subscriber type 202 values returned by the HSS 120 in SAA 404 messages.

In some examples, when the S-CSCF 114 receives an SAA 404 from the HSS 120 that indicates a subscriber type 202 associated with the UE 102, the S-CSCF 114 can generate a SIP response message 406 for the P-CSCF 110 that forwarded the SIP Register message 302 from the UE 102. The SIP response message 406 can use a message header or message body to indicate the subscriber type 202 associated with the UE 102 to the P-CSCF 110. For example, a SIP response message 406 generated by the S-CSCF 114 can include a header field for a subscriber type 202 value, such as a field in a private header or other type of header. In some examples, the SIP response message 406 can be a message, such as a SIP "200 OK" message that responds to the SIP Register message 302, but includes a value for the subscriber type 202. For example, if the S-CSCF 114 receives an SAA 404 indicating a subscriber type 202 of "B" via a Diameter protocol Cx interface from the HSS, the S-CSCF 114 can then send a SIP response message 406 to the P-CSCF 110 that indicates in a private header field that the UE 102 is associated with the subscriber type 202 of "B." Like the S-CSCF 114, the P-CSCF 110 can have policies or mapping data in memory that allow the P-CSCF 110 to interpret subscriber type 202 values identified in SIP response messages 406 from S-CSCFs 114.

When the P-CSCF 110 receives a SIP response message 406 that identifies a subscriber type 202 associated with a UE 102, the P-CSCF 110 can use a Diameter protocol Rx interface or a REST HTTP interface to send a PCRF request message 408 to a PCRF 118 selected from a subset of PCRFs 118 that have been carved out for that subscriber type 202. In some examples, a PCRF request message 408 can be a Diameter protocol Authorize/Authenticate Request (AAR) message or an HTTP request. For example, when a SIP response message 406 from an S-CSCF 114 has a value for a subscriber type 202 indicating that a UE 102 is associated with a subscriber of an MVNO's services, the P-CSCF 110 can send a PCRF request message 408 over an Rx interface to request that a PCRF 118 that has been carved out for subscribers of that MVNO provide the core network 106 with PCC rules for the UE 102.

Accordingly, even though a P-CSCF 110 may not have a Diameter protocol Cx interface or other connection with the HSS 120, the P-CSCF 110 can still identify the subscriber type 202 associated with a UE 102 based on information in the SIP response message 406 received from the S-CSCF 114. Because this can allow the P-CSCF 110 to contact a PCRF 118 that corresponds to the same subscriber type 202 as the UE 102, the selected PCRF 118 may be better positioned to assist with communication sessions for the UE 102 than PCRFs 118 associated with other subscriber types 202. For instance, the selected PCRF 118 may store PCC rules that are specific to the subscriber type 202 associated with the UE 102. Similarly, if PCRFs 118 associated with different subscriber types 202 go offline, become overloaded, or experience other issues, the selected PCRF 118 may remain available to provide PCC rules for traffic associated with UEs 102 of the same subscriber type 202 despite the problems with the other PCRFs 118.

In some examples, when the S-CSCF 114 receives an SAA 404 from the HSS 120 that indicates a subscriber type 202 associated with the UE 102, the S-CSCF 114 can send third-party registration (TPR) messages 410 to one or more application servers 116 that have been carved out for that subscriber type 202. For example, when an MNO has carved out a subset of application servers 116 containing application servers 116B for subscribers of a first MVNO, the SAA 404 indicates that the UE's subscriber type 202 is type "B," and subscriber type "B" is used to indicate that a user is a subscriber to the first MVNO's services, the S-CSCF 114 can send TPR messages 410 about the UE 102 to one or more application servers 116B in the subset carved out for the first MVNO.

In some cases, the SAA 404 can contain AVPs or other information that identify which types of application servers 116 should be sent TPR messages 410, for instance indicating that the S-CSCF 114 should send a TPR message 410 to a TAS and also to an RCS server for the UE 102. In other cases, the S-CSCF 114 can use default rules or other logic to determine which types of application servers 116 should be sent TPR messages 410. Accordingly, the S-CSCF 114 can send TPR messages 410 to one or more specific types of application servers 116 within a subset corresponding to the UE's subscriber type 202.

Here, because a selected application server 116 that receives a TPR message 410 about a UE 102 from the S-CSCF 114 corresponds to the same subscriber type 202 as the UE 102, the selected application server 116 may be better positioned to handle the UE 102 than application servers 116 associated with other subscriber types 202. For instance, the selected application server 116 may have policies, rules, or other configurations that are specific to the subscriber type 202 associated with the UE 102. Similarly, if application servers 116 associated with different subscriber types 202 go offline, become overloaded, or experience other issues, the selected application server 116 may remain available such that UEs 102 associated with the same subscriber type 202 can receive services from the selected application server 116 despite problems with the other application servers. For example, if a first TAS is reserved to provide services for voice calls for MNO subscribers and a second TAS is reserved to provide services for voice calls for MVNO subscribers, and the second TAS becomes overloaded, voice calls for MNO subscribers can be unaffected because S-CSCFs 114 can send TPR messages 410 to the first TAS for UEs 102 associated with MNO subscribers.

In other examples, application servers 116 may not be specifically reserved or carved out for specific subscriber types 202, but can be configured to provide different services for different subscriber types 202 or prioritize between different subscriber types 202. In these examples, an S-CSCF 114 may include a value for a UE's subscriber type in a TPR message 410, and the application server 116 can have policies or mapping data in memory that allows it to interpret subscriber type 202 values in TPR messages 410 and provide services to UEs 102 based on their subscriber type 202. For example, the S-CSCF 114 can express a UE's subscriber type 202 in a private header or other element of a TPR message 410 application server 116, such that the UE's subscriber type 202 can be used by the application server 116. In some examples, informing an application server 116 of a UE's subscriber type 202 in a TPR message 410 can reduce or eliminate other types of messaging. For example, while an application server 116 may be able to exchange messages with the HSS 120 via a Diameter protocol Sh interface to obtain data about the UE 102 or a user associated with the UE 102, the application server may be able to avoid such messaging because it knows the UE's subscriber type 202 directly from the TPR message 410.

Example Architecture

Figure 5:
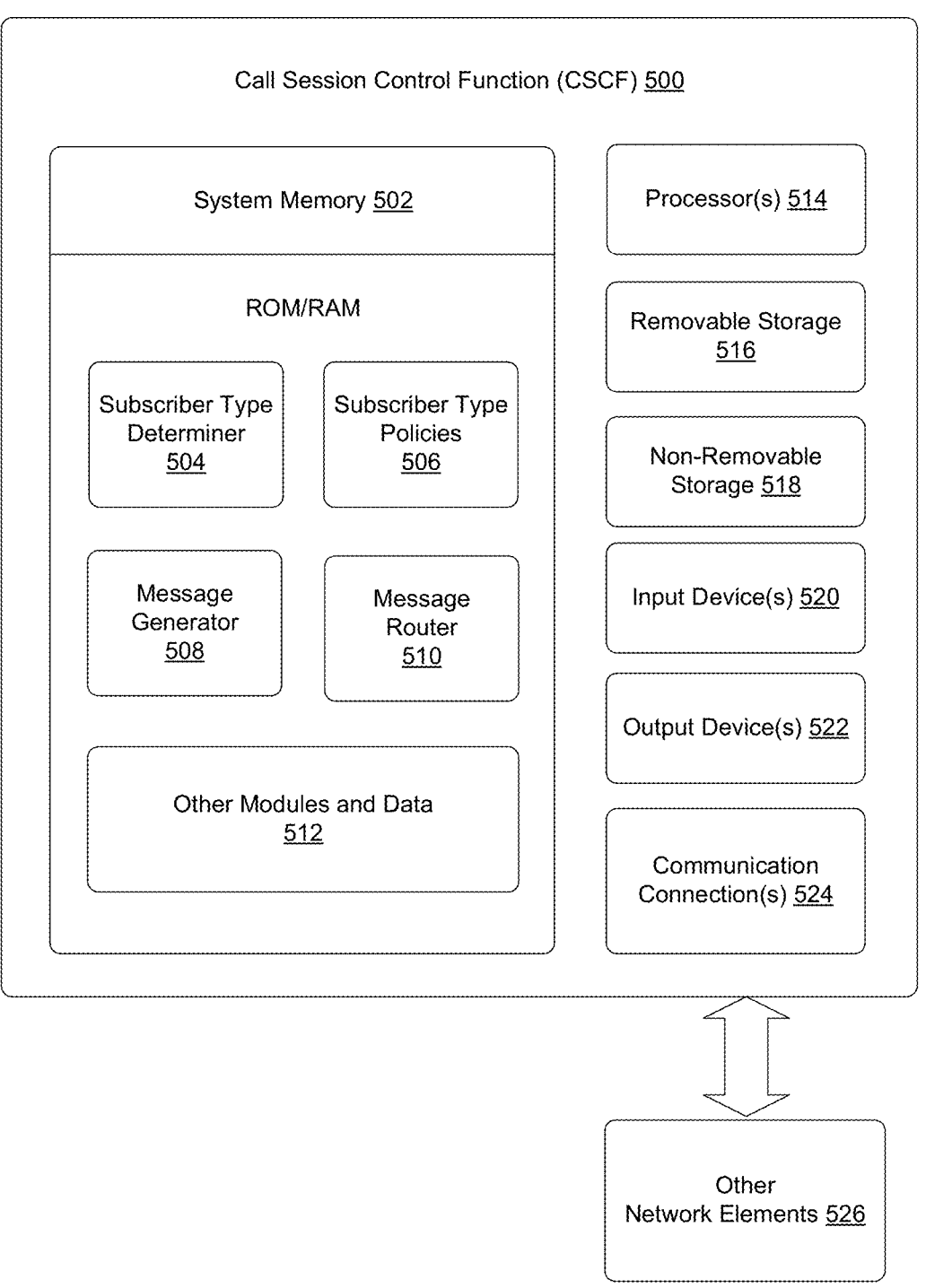
FIG. 5 depicts an example system architecture of a Call Session Control Function (CSCF) of an IMS.

FIG. 5 depicts an example system architecture of a Call Session Control Function (CSCF) 500 of an IMS 108. In some examples, the CSCF 500 shown in FIG. 5 can be an S-CSCF 114. In other examples, the CSCF 500 shown in FIG. 5 can be a P-CSCF 110 or an I-CSCF 112.

The CSCF 500 can be, or run on, a computing device that has a system memory 502. The system memory 502 can store data for the CSCF 500, including a subscriber type determiner 504, subscriber type policies 506, a message generator 508, a message router 510, and/or other modules and data 512. The computing device of the CSCF 500 can also include processor(s) 514, removable storage 516, non-removable storage 518, input device(s) 520, output device(s) 522, and/or communication connections 524 for communicating with other network elements 526.

In various examples, system memory 502 can be volatile (such as RAM), nonvolatile (such as ROM, flash memory, etc.), or some combination of the two. Example system memory 502 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The subscriber type determiner 504 can use data returned to the CSCF 500 in a message, such as a Diameter message, an HTTP message, or a SIP message, to determine a subscriber type 202 associated with a UE 102. For example, a subscriber type determiner 504 of an I-CSCF 112 can determine a UE's subscriber type 202 based on subscriber type 202 information in a UAA 306 sent to the I-CSCF 112 from an HSS 120 over a Diameter protocol Cx interface. As another example, a subscriber type determiner 504 of an S-CSCF 114 can determine a UE's subscriber type 202 based on subscriber type 202 information in a SAA 404 sent to the S-CSCF 114 from an HSS 120 over a Diameter protocol Cx interface. As yet another example, a subscriber type determiner 504 of a P-CSCF 110 can determine a UE's subscriber type 202 based on subscriber type 202 information in a SIP response message 406 sent to the P-CSCF 110 from an S-CSCF 114, such as subscriber type 202 information in a private header of the SIP response message 406. In some examples, the subscriber type determiner 504 can have predefined mappings of possible values for the subscriber type 202 information in a Diameter message or a SIP message to specific types or classes of subscribers, such that the subscriber type determiner 504 can interpret and/or translate predefined values in received messages into corresponding mapped subscriber types 202.

The subscriber type policies 506 can indicate, based on the subscriber type 202 associated with a UE 102, one or more actions that the CSCF 500 should perform in association with the UE 102. In some examples, the subscriber type policies 506 can be policies that have been predefined by an MNO or other operator of the telecommunication network. For example, subscriber type policies 506 can identify subsets of S-CSCFs 114, application servers 116, and/or PCRFs 118 that have been carved out or reserved for specific subscriber types 202 by an MNO or other network operator.

Accordingly, based on subscriber type policies 506, the CSCF 500 can route messages to, or otherwise contact, one or more other network elements that correspond to the same subscriber type 202 as the UE 102. For example, an I-CSCF 112 can determine which S-CSCF 114 to assign to a UE 102 based at least in part on a subscriber type policy 506 that identifies S-CSCFs 114 associated with the same subscriber type 202 as the UE 102. As another example, an S-CSCF 114 can determine which application servers 116 it should send TPR messages 410 to for a UE 102 based at least in part on a subscriber type policy 506 that identifies application servers 116 associated with the same subscriber type 202 as the UE 102. As yet another example, a P-CSCF 110 can determine which PCRF 118 to contact about a UE 102 based at least in part on a subscriber type policy 506 that identifies PCRFs 118 associated with the same subscriber type 202 as the UE 102.

The message generator 508 can generate Diameter, HTTP, and/or SIP messages sent by the CSCF 500. For example, the message generator 508 can generate messages sent by the CSCF to an HSS 120 over a Diameter protocol Cx interface, or to a PCRF over a Diameter protocol Rx interface. As another example, the message generator 508 can generate SIP response messages 406 and/or TPR messages 410 that include information about a subscriber type 202 for a UE 102 in a message header or body.

The message router 510 can send messages that have been generated by the message generator 508 or that were received by the CSCF 500 to another network element based on the subscriber type policies 506 and/or the subscriber type 202 associated with a UE 102. For example, a message router 510 of an I-CSCF 112 can route a SIP Register message 302 associated with a UE 102 that was received from a P-CSCF 110 on to a particular S-CSCF 114 that is associated with the same subscriber type 202 as the UE 102. As another example, a message router 510 of an S-CSCF 114 can send a SIP response message 406 that identifies the subscriber type 202 associated with a UE 102 to a P-CSCF 110, and/or send TPR messages 410 for the UE 102 to one or more application servers 116 that are associated with the same subscriber type 202 as the UE 102.

The other modules and data 512 can be utilized by the CSCF 500 to perform or enable performing any action taken by the CSCF 500. The other modules and data 512 can include a platform and applications, and data utilized by the platform and applications.

In some examples, the processor(s) 514 can be a central processing unit (CPU), a graphics processing unit (GPU), both CPU and GPU, or other processing unit or component known in the art.

The computing device of the CSCF 500 can also include additional data storage devices (removable and/or non-removable) such as, for example, magnetic disks, optical disks, or tape. Such additional storage is illustrated in FIG. 5 by removable storage 516 and non-removable storage 518. Computer storage media may include volatile and nonvolatile, removable and non-removable media implemented in any method or technology for storage of information, such as computer readable instructions, data structures, program modules, or other data. System memory 502, removable storage 516 and non-removable storage 518 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the CSCF 500. Any such computer-readable storage media can be part of the CSCF 500. In various examples, any or all of system memory 502, removable storage 516, and non-removable storage 518, store programming instructions which, when executed, implement some or all of the herein-described operations of the CSCF 500.

In some examples, the computing device of the CSCF 500 can also have input device(s) 520, such as a keyboard, a mouse, a touch-sensitive display, voice input device, etc., and/or output device(s) 522 such as a display, speakers, a printer, etc. These devices are well known in the art and need not be discussed at length here.

The computing device of the CSCF 500 can also contain communication connections 524 that allow the CSCF 500 to communicate with other network elements 526, such as UEs 102, application servers 116, other CSCFs 500, PCRFs 118, an HSS 120, and/or any other elements of the telecommunication network. For example, the communication connections 524 can allow the CSCF 500 to send, receive, and/or forward SIP messages, such as a SIP message received from a UE 102 or another CSCF 500, or a SIP message sent to or from an application server 116. As another example, the communication connections 524 can allow the CSCF 500 to send and receive Diameter protocol messages, such as messages exchanged over a Diameter Rx interface with a PCRF 118 when the CSCF 500 is a P-CSCF 110 or messages exchanged over a Diameter Cx interface with an HSS 120 when the CSCF 500 is an I-CSCF 112 or a S-CSCF 114.

Example Operations

Figure 6:
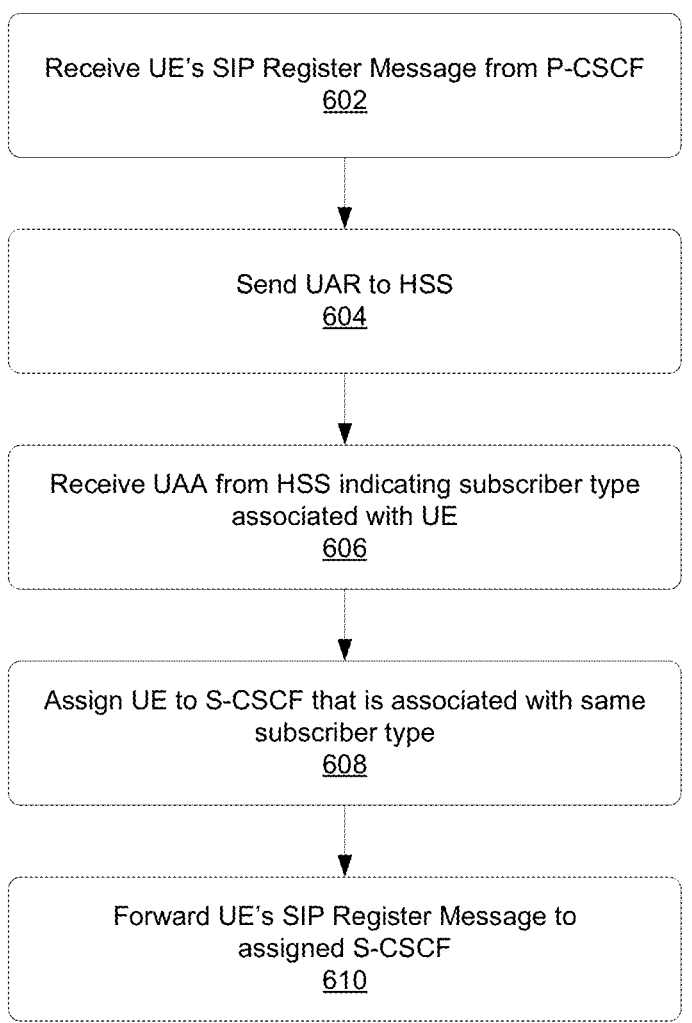
FIG. 6 depicts a flow chart of actions that can be taken by an I-CSCF during IMS registration for a UE.

FIG. 6 depicts a flow chart of actions that can be taken by an I-CSCF 112 during IMS registration for a UE 102.

At block 602, the I-CSCF 112 can receive a SIP Register message 302 from a P-CSCF 110. The SIP Register message 302 can have originated at a UE 102, and can include information about the UE 102 and/or a user of the UE 102, such as an IMPI, IMPU, and/or an IP address.

At block 604, the I-CSCF 112 can send a UAR 304 to an HSS 120 via a Diameter protocol Cx interface. The UAR 304 can include information about the UE 102 and/or a user of the UE 102, such that the HSS 120 can look up a user profile 124 associated with a user of the UE 102 in a user profile database 122. For example, the UAR 304 can include an IMPI included in the SIP Register message 302 from the UE 102, such that the HSS 120 can identify a user profile 124 with that IMPI in other profile data 204.

At block 606, the I-CSCF 112 can receive a UAA 306 from the HSS 120 via the Diameter protocol Cx interface. The UAA 306 can express a value of a subscriber type 202 associated with the user of the UE 102. For example, the HSS 120 can have found a user profile 124 corresponding to the user, and included the value of the subscriber type 202 from that user profile in an AVP of the UAA 306. The UAA 306 may also indicate that an S-CSCF 114 has not yet been assigned to the UE 102.

At block 608, the I-CSCF 112 can assign a S-CSCF 114 to the UE 102 based at least in part on the subscriber type 202 for the UE 102 returned in the UAA 306. For example, the I-CSCF 112 can have mapping information and/or predefined policies that identifies one or more S-CSCFs 114 associated with the same subscriber type 202 as the UE 102. The I-CSCF 112 can assign the UE 102 to an S-CSCF 114 that is associated with the same subscriber type 202.

At block 610, the I-CSCF 112 can forward the SIP Register message 302 received at block 602 on to the S-CSCF 114 assigned to the UE 102 during block 608.

Figure 7:
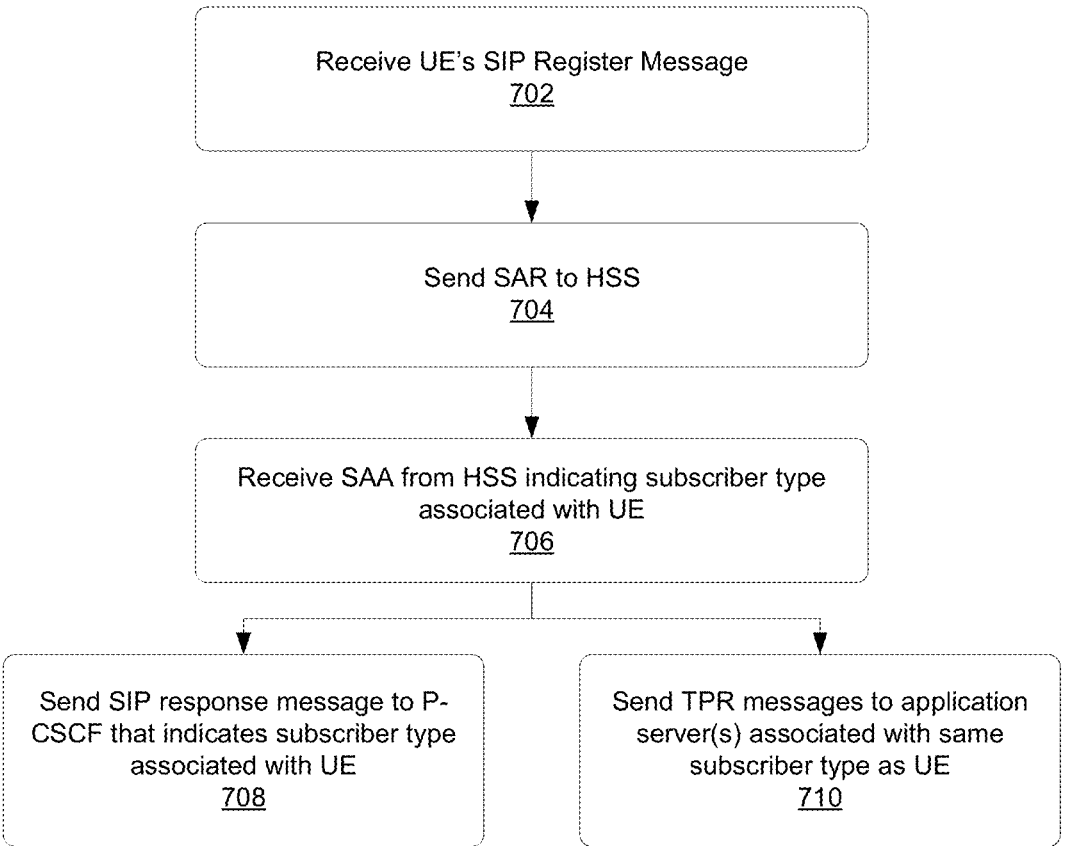
FIG. 7 depicts a flow chart of actions that can be taken by an S-CSCF during IMS registration for a UE.

FIG. 7 depicts a flow chart of actions that can be taken by an S-CSCF 114 during IMS registration for a UE 102.

At block 702, the S-CSCF 114 can receive a SIP Register message 302 associated with a UE 102. The SIP Register message 302 can have originated at a UE 102, and have been routed through the IMS 108 via a P-CSCF 110 and an I-CSCF 112. The SIP Register message 302 can include information about the UE 102 and/or a user of the UE 102, such as an IMPI, IMPU, and/or an IP address. In some examples, the SIP Register message 302 received at block 702 can be a second SIP Register message 302 sent by the UE 102 that includes authentication credentials for the UE 102, such that the S-CSCF 114 can authenticate the UE 102. For example, the S-CSCF 114 may have previously received another SIP Register message 302 from the UE 102, obtained authentication data for the UE 102 from the HSS 120, denied the UE's IMS registration, and then waited for a second SIP register message 302 that includes the authentication credentials. However, in other examples, the SIP Register message 302 received at block 702 can be a first SIP Register message 302 sent by the UE 102 during IMS registration.

At block 704, the S-CSCF 114 can send a SAR 402 to an HSS 120 via a Diameter protocol Cx interface. The SAR 402 can include information about the UE 102 and/or a user of the UE 102, such that the HSS 120 can look up a user profile 124 associated with a user of the UE 102 in a user profile database 122. For example, the SAR 402 can include an IMPI included in the SIP Register message 302 from the UE 102, such that the HSS 120 can identify a user profile 124 with that IMPI in other profile data 204.

At block 706, the S-CSCF 114 can receive a SAA 404 from the HSS 120 via the Diameter protocol Cx interface. The SAA 404 can express a value of a subscriber type 202 associated with the user of the UE 102. For example, the HSS 120 can have found a user profile 124 corresponding to the user, and included the value of the subscriber type 202 from that user profile in an AVP of the SAA 404.

At block 708, the S-CSCF 114 can generate a SIP response message 406 that includes the value of the subscriber type 202 associated with the UE 102, and send the SIP response message 406 to the P-CSCF 110 that initially received the SIP Register message 320 from the UE 102. For example, the S-CSCF 114 can include the value of the subscriber type 202 associated with the UE 102 in a private header of a "200 OK" SIP message sent to the P-CSCF 110 in response to the SIP Register message 302. The P-CSCF 110 can then use the subscriber type 202 associated with the UE 102 to contact a PCRF 118 that is associated with the same subscriber type 202 as the UE 102. For example, the P-CSCF 110 can identify a PCRF 118 that is associated with the same subscriber type 202 as a UE 102, and send a PCRF request message 408, such as an AAR, over a Diameter protocol Rx interface to the identified PCRF 118. The PCRF request message 408 can request that the identified PCRF 118 provide the core network 106 with PCC rules for traffic associated with the UE 102.

At block 710, the S-CSCF 114 can send TPR messages 410 to one or more application servers 116 associated with the same subscriber type 202 as the UE 102. For example, the S-CSCF 114 can have mapping information and/or predefined policies that identifies one or more application servers 116 associated with the same subscriber type 202 as the UE 102. In some examples, the SAA 404 may identify which types of application servers 116 should be sent TPR messages 410 for the UE 102, and the S-CSCF 114 may select one of each of those types of application servers 116 based on which ones are associated with the same subscriber type 202 as the UE 102. In some examples, the S-CSCF 114 can include information about the subscriber type 202 associated with the UE 102 within the TPR messages 410, such that the application servers 116 can take actions based on the UE's subscriber type 202. In other examples, because an application server 116 that receives a TPR message 410 was selected by the S-CSCF 114 because it is associated with the same subscriber type 202 as the UE 102, the application server 116 can determine that the UE 102 is associated with that subscriber type 202 based on receipt of the TPR message 410 even if the TPR message 410 does not directly indicate the subscriber type 202 associated with the UE 102.

In some examples, blocks 708 and 710 can occur sequentially in either order, or occur substantially simultaneously. Alternately, in some examples the S-CSCF 114 may perform block 708 and not block 710, or block 710 and not block 708.

Figure 8:
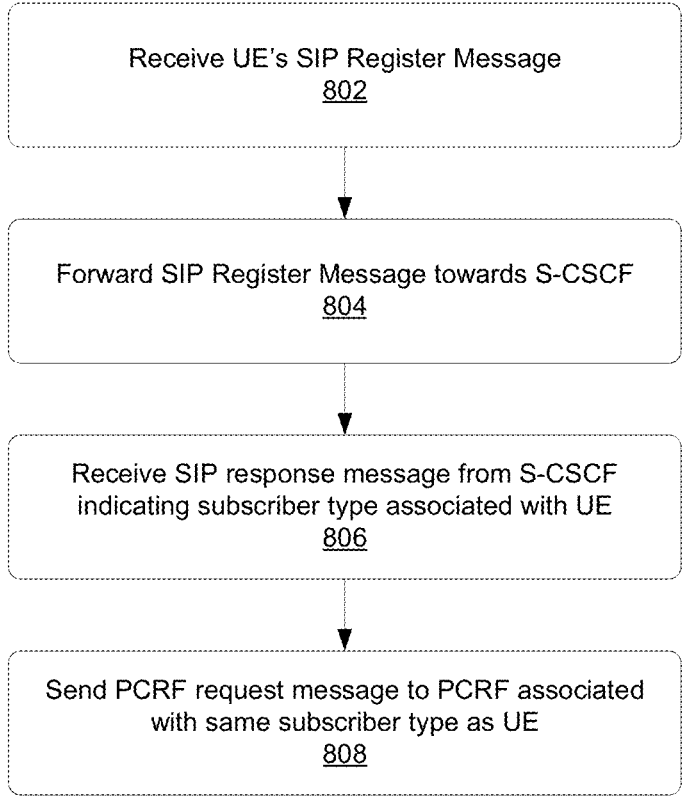
FIG. 8 depicts a flow chart of actions that can be taken by a P-CSCF during IMS registration for a UE.

FIG. 8 depicts a flow chart of actions that can be taken by a P-CSCF 110 during IMS registration for a UE 102.

At block 802, the P-CSCF 110 can receive a SIP Register message 302 from a UE 102.

At block 804, the P-CSCF 110 can forward the SIP Register message 302 to an I-CSCF 112, which can in turn forward the SIP Register message 302 to an S-CSCF 114.

At block 806, the P-CSCF 110 can receive a SIP response message 406 from the S-CSCF 114 via the I-CSCF 112. The SIP response message 406 can indicate a subscriber type 202 associated with the UE 102. For example, the S-CSCF 114 can include a value for the subscriber type 202 associated with the UE 102 in a private header of a "200 OK" SIP message sent to the P-CSCF 110 in response to the SIP Register message 302.

At block 808, the P-CSCF 110 can use the subscriber type 202 associated with the UE 102, as identified in the SIP response message 406, to contact a PCRF 118 that is associated with the same subscriber type 202 as the UE 102. For example, the P-CSCF 110 can have mapping information and/or predefined policies that identifies one or more PCRFs 118 associated with the same subscriber type 202 as the UE 102. The P-CSCF 110 can accordingly identify a PCRF 118 that is associated with the same subscriber type 202 as a UE 102, and send a PCRF request message 408, such as an AAR, over a Diameter protocol Rx interface to the identified PCRF 118. The PCRF request message 408 can request that the identified PCRF 118 provide the core network 106 with PCC rules for traffic associated with the UE 102.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
   receiving, by a Proxy Call Session Control Functions (P-CSCF) of an internet protocol (IP) Multimedia Subsystem (IMS), a Session Initiation Protocol (SIP) registration message associated with a user equipment (UE);
   forwarding, by the P-CSCF, the SIP registration message to an Interrogating Call Session Control Function (I-CSCF), wherein the I-CSCF assigns the UE to a Serving Call Session Control Function (S-CSCF) based at least in part on a subscriber type associated with the UE;
   receiving, by the P-CSCF, a SIP response message from the S-CSCF indicating the subscriber type associated with the UE, wherein the subscriber type is included in a private header field and includes a predefined value of multiple predefined values that is associated with a classification of a subscriber distinct from other classes of subscriber, the classification of the subscriber indicating at least one of a class of service, a service level, or a service plan; and
   sending, by the P-CSCF, a Policy and Charging Rules Functions (PCRF) request message to a PCRF selected from a subset of PCRFs that have been carved out for the subscriber type, wherein the PCRF request message is sent via a Diameter protocol Rx interface.

2. The method of claim 1, wherein the subscriber type is selected from at least a first value indicating that a user of the UE subscribes to services of a mobile network operator (MNO) and a second value indicating that the user of the UE subscribes to services of a mobile virtual network operator (MVNO).

3. The method of claim 1, wherein the subscriber type is selected from at least a first value indicating that a user of the UE subscribes to a first type of subscription plan for Long-Term Evolution (LTE) services and a second value indicating that the user of the UE subscribes to a second type of subscription plan for fifth generation (5G) services.

4. The method of claim 1, wherein the SIP registration message includes at least one of an IP Multimedia Private Identity (IMPI), an IMS Public User Identity (IMPU), or an IP address.

5. The method of claim 1, wherein the P-CSCF is configured to select the PCRF that is associated with the subscriber type associated with the UE and to send information about the UE to the PCRF.

6. The method of claim 1, wherein the subscriber type is selected from at least a first value indicating that a user of the UE subscribes to a priority tier subscription plan and a second value indicating that the user of the UE subscribes to a standard tier subscription plan.

7. An IP Multimedia Subsystem (IMS) comprising:
   a Proxy Call Session Control Functions (P-CSCF) associated with a user equipment (UE), the P-CSCF configured to:
   receive, by the P-CSCF, a Session Initiation Protocol (SIP) registration message associated with a user equipment (UE);
   forward, by the P-CSCF, the SIP registration message to an Interrogating Call Session Control Function (I-CSCF), wherein the I-CSCF assigns the UE to a Serving Call Session Control Function (S-CSCF) based at least in part on the subscriber type associated with the UE;
   receive, by the P-CSCF, a SIP response message from the S-CSCF indicating a subscriber type associated with the UE, wherein the subscriber type is included in in a private header field and includes a predefined value of multiple predefined values that is associated with a classification of a subscriber distinct from other classes of subscriber, the classification of the subscriber indicating at least one of a class of service, a service level, or a service plan; and
   send, by the P-CSCF, a Policy and Charging Rules Functions (PCRF) request message to a PCRF selected from a subset of PCRFs that have been carved out for the subscriber type, wherein the PCRF request message is sent via a Diameter protocol Rx interface.

8. The IMS of claim 7, wherein the subscriber type is selected from at least a first value indicating that a user of the UE subscribes to services of a mobile network operator (MNO) and a second value indicating that the user of the UE subscribes to services of a mobile virtual network operator (MVNO).

9. The IMS of claim 7, wherein the subscriber type is selected from at least a first value indicating that a user of the UE subscribes to a first type of subscription plan for Long-Term Evolution (LTE) services and a second value indicating that the user of the UE subscribes to a second type of subscription plan for fifth generation (5G) services.

10. The IMS of claim 7, wherein the SIP registration message includes at least one of an IP Multimedia Private Identity (IMPI), an IMS Public User Identity (IMPU), or an IP address.

11. The IMS of claim 7, wherein the P-CSCF is configured to select the PCRF that is associated with the subscriber type associated with the UE and to send information about the UE to the PCRF.

12. The IMS of claim 7, wherein the subscriber type is selected from at least a first value indicating that a user of the UE subscribes to a priority tier subscription plan and a second value indicating that the user of the UE subscribes to a standard tier subscription plan.

13. A computing device comprising:

one or more processors; and non-transitory computer-readable media storing computer-executable instructions that, when executed by the one or more processors, cause the one or more processors to perform actions comprising:

receiving, by a Proxy Call Session Control Functions (P-CSCF) of an IP Multimedia Subsystem (IMS), a Session Initiation Protocol (SIP) registration message associated with a user equipment (UE);

forwarding, by the P-CSCF, the SIP registration message to an Interrogating Call Session Control Function (I-CSCF), wherein the I-CSCF assigns the UE to a Serving Call Session Control Function (S-CSCF) based at least in part on the subscriber type associated with the UE;

receiving, by the P-CSCF, a SIP response message from the S-CSCF indicating a subscriber type associated with the UE, wherein the subscriber type is included in in a private header field and includes a predefined value of multiple predefined values that is associated with a classification of a subscriber distinct from other classes of subscriber, the classification of the subscriber indicating at least one of a class of service, a service level, or a service plan; and sending, by the P-CSCF, a Policy and Charging Rules Functions (PCRF) request message to a PCRF selected from a subset of PCRFs that have been carved out for the subscriber type, wherein the PCRF request message is sent via a Diameter protocol Rx interface.

14. The computing device of claim 13, wherein the subscriber type is selected from at least a first value indicating that a user of the UE subscribes to services of a mobile network operator (MNO) and a second value indicating that the user of the UE subscribes to services of a mobile virtual network operator (MVNO).

15. The computing device of claim 13, wherein the subscriber type is selected from at least a first value indicating that a user of the UE subscribes to a first type of subscription plan for Long-Term Evolution (LTE) services and a second value indicating that the user of the UE subscribes to a second type of subscription plan for fifth generation (5G) services.

16. The computing device of claim 13, wherein the SIP registration message includes at least one of an IP Multimedia Private Identity (IMPI), an IMS Public User Identity (IMPU), or an IP address.

17. The computing device of claim 13, wherein the P-CSCF is configured to select the PCRF that is associated with the subscriber type associated with the UE and to send information about the UE to the PCRF.

18. The computing device of claim 13, wherein the subscriber type is selected from at least a first value indicating that a user of the UE subscribes to a priority tier subscription plan and a second value indicating that the user of the UE subscribes to a standard tier subscription plan.

* * * * *